(12) United States Patent
Regmi

(10) Patent No.: US 8,702,033 B2
(45) Date of Patent: Apr. 22, 2014

(54) PILOTLESS AIRCRAFT FOR COMMERCIAL AND MILITARY USE

(76) Inventor: Ruchit Kumar Regmi, Kathmandu (NP)

(*) Notice: Subject to any disclaimer, the term of this patent is extended or adjusted under 35 U.S.C. 154(b) by 251 days.

(21) Appl. No.: 13/304,363

(22) Filed: Nov. 24, 2011

(65) Prior Publication Data
US 2012/0072058 A1 Mar. 22, 2012

Related U.S. Application Data

(63) Continuation-in-part of application No. 12/378,025, filed on Jan. 6, 2009, now abandoned.

(51) Int. Cl.
*B64C 13/16* (2006.01)
(52) U.S. Cl.
USPC ............ 244/76 R; 244/175; 244/183; 701/4; 701/11
(58) Field of Classification Search
USPC ................ 244/76 R, 175, 183; 701/4, 11
See application file for complete search history.

(56) References Cited

U.S. PATENT DOCUMENTS

| | | | |
|---|---|---|---|
| 2,499,349 A | 3/1950 | Ayres | |
| 5,978,715 A | 11/1999 | Briffe et al. | |
| 6,886,776 B2 | 5/2005 | Wagner et al. | |
| 2003/0062443 A1 | 4/2003 | Wagner et al. | |
| 2005/0165516 A1 | 7/2005 | Haissig et al. | |
| 2006/0106506 A1* | 5/2006 | Nichols et al. | 701/3 |
| 2009/0313199 A1* | 12/2009 | Hagelin et al. | 706/47 |
| 2011/0184593 A1* | 7/2011 | Swope | 701/12 |

OTHER PUBLICATIONS

The entire application and prosecution of U.S. Appl. No. 12/378,025, filed Jan. 6, 2009, the parent to this application.

* cited by examiner

*Primary Examiner* — John W Eldred
(74) *Attorney, Agent, or Firm* — Merek, Blackmon & Voorhees, LLC

(57) ABSTRACT

An aircraft control system is described having an Automatic Monitoring System ("AMS"), an Aircraft Parameter Management Computer ("APC"), and a Flight Management Computer ("FMC") to monitor the parameters of the aircraft automatically and to fly the aircraft without requiring a pilot to fly. The system respond to data within the systems and with data provided by a communication/navigation aid of the airport. The built-in systems of the aircraft process the data to allow pilotless operation of the aircraft along a predetermined route while maintaining proper spacing from prior art and other automated aircraft. An aircraft in accordance with the invention utilizes programmed software, electronics circuit and feedback system to fly the aircraft within the designated/destined routes and airports automatically while providing increased security by preventing accidents caused by incorrect or unauthorized human influence.

12 Claims, 1 Drawing Sheet

PILOTLESS AIRCRAFT FOR COMMERCIAL AND MILITARY USE

CROSS REFERENCE TO RELATED APPLICATIONS

This application is a continuation-in part of application Ser. No. 12/378,025, filed Jan. 6, 2009 now abandoned, entitled "Aircraft without Pilot (for Commercial and Military Use)," which is incorporated herein by reference.

BACKGROUND OF THE INVENTION

1. Field of the Invention

This invention relates to an aircraft which can safely fly passengers or other cargo to a destination or along a designated routes without the need for a pilot on the aircraft.

2. Description of the Prior Art

A major cause of aircraft accidents are due to pilot or other human errors and influence, such as by hijacking or by controlling or otherwise replacing the pilot in the cockpit of an aircraft. According to the present invention, all of the procedures that must be implemented by a pilot can be done automatically within the aircraft without requiring the intervention of a pilot. All of the procedures and decisions that have to be taken to fly safely have already been automated through programmed software, electrical, electronic and/or computerized systems. The electronic system and its subsets determine and implement commands to cause the aircraft to taxi, takeoff, fly and land along a pre-determined route and/or take corrective action as necessitated by emergencies or other considerations.

In the currently proposed invention, the controls and decisions are completed using software, automatic feedback circuits and/or from the co-ordination and utilization of an APC ("Aircraft Parameter Management Computer") system, a FMC ("Flight Management Computer") system, and an AMS ("Automatic Monitoring Systems") system. Since during flight there is no need for a pilot to fly in the destined/designated routes and airport safely, the number of aircraft incidents due to pilot mistakes or other human influence can be reduced. The use of electronics to fly the aircraft allow the aircraft to be completely secured because the cockpit door can be sealed prior to flight and opened only at the next airport by the ground staff of airlines. This should further prevent and/or reduce the chance of hijacking or other unauthorized control of the aircraft.

SUMMARY OF THE INVENTION

The present invention utilizes the fundamental principles of aeronautics and innovated software applications, electrical and electronics technology, and/or computer engineering to create automated systems for an aircraft to allow it to operate automatically ("pilotlessly"). In the invention, the concept of RADAR has also been advanced and adapted for use to control proper spacing of the aircraft relative to other aircraft. The RADAR system according to the present invention has been improved significantly and has been utilized to also provide safe flight automatically by determining potential turbulence/severe weather in the proposed flight path and/or to avoid other obstacles and aircraft within the flight path.

Accordingly, it is a principal object of a preferred embodiment of the invention to an automated system for an aircraft to allow the aircraft to operate fully automatically without the need for a pilot.

It is another object of the invention to provide an aircraft that has onboard systems that coordinate with airport based systems to allow the aircraft to travel between airports automatically.

It is a further object of the invention to provide automated systems for an aircraft that can adapt to emergencies and faults to provide continued safe operation of the aircraft Still another object of the invention is to provide an automated flight system that allows the aircraft to communicate with land based systems in emergency to land at alternate locations automatically during emergencies.

It is another object of the invention to use RADAR to provide safe spacing between aircraft and to sense and avoid inclement weather or turbulence automatically.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

Similar reference characters denote corresponding features consistently throughout the attached drawings.

DETAILED DESCRIPTION OF THE PREFERRED EMBODIMENT(S)

The present invention uses the principles of aerospace engineering to improve the safety and reliability of pilotless flight.

A(1) Traffic Collision Avoidance

Traffic collision avoidance of pilotless aircraft according to the present invention is accomplished in one aspect using principles of present day Traffic Collision Avoidance Systems ("TCAS") on current aircraft. However, in the present invention normal TCAS is supplemented by installing specialized systems on the aircraft to provides alert not only for vertical separation of aircraft traffic but also to track aircraft in front ("forward") or behind the aircraft ("backwards") in flight queues/paths, etc. In this manner backward traffic collision sensing, alerting and avoiding also can be used, which is important considering likely increases in future air traffic and congestion. In the future, the use of only vertical separation as flight separation criteria may be insufficient. A system capable of up/down ("vertical") and backward/forward ("lateral") traffic collision avoiding system therefore does a much better job of providing complete ("three dimensional") security for the pilotless aircraft. The improved TCAS system can be used for sensing up/down and forward/backward traffic to alert the aircraft if other traffic in the area is less than the desired separation limit or is in a path which will infringe the desired separation area. This allows the TCAS to alert and to enable the craft to avoid collision from other aircrafts that may be above ("UP") the aircraft and within the restricted separated vertical space or below ("DOWN") the aircraft within the restricted separated vertical space. Similarly TCAS can be installed to alert and to enable the craft to avoid collision from other aircrafts which are in front ("FORWARD") within the restricted horizontal separation limit or behind ("BACKWARD") the aircraft within the restricted horizontal separation limit).

Alerting and correcting the aircraft path can be accomplished by simultaneously by:

(a) Increasing/Decreasing lift; or
(b) Increasing/Decreasing speed

Figure 1:
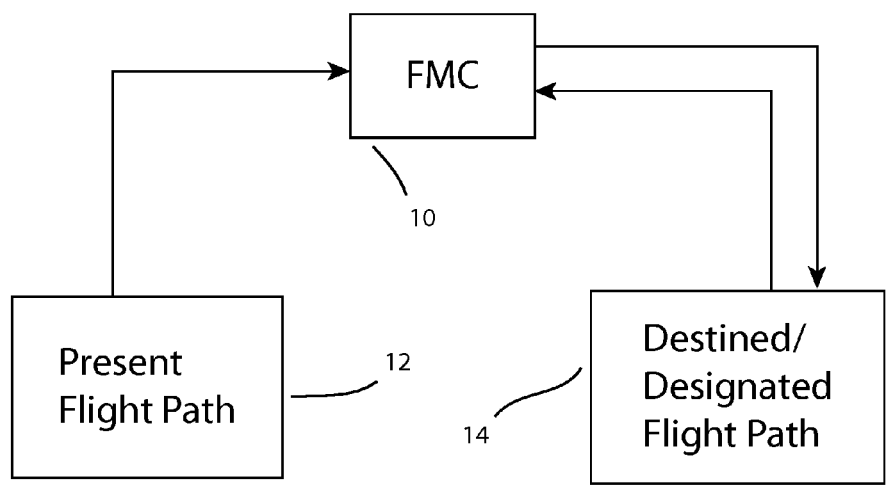
FIG. 1 is a block diagram of the concept of aircraft during route following.

The concept of RADAR systems can be used to sense the Up/Down and Forward/Backward traffic separation and to avoid traffic collisions. In this system, for example, the time interval between transmission of RADAR signals and the reception of the reflected energy can be used to determine the distance of near aircraft with which a traffic collision could be possible. The time intervals in receiving the echo signals will be translated into electrical signals and those signals can be translated into electrical signals that can be used in the feedback loop of the Flight Management Computer ("FMC") of the aircraft. As shown in FIG. 1, the FMC 10 can change the aircraft's own path 12 to a new designated flight path 14 according to the time interval & strength in receiving echo signals, if it appears to change the aircraft's path to avoid collision.

In a typical RADAR system, an Antenna, Receiver-Transmitter and indicator are used. However, in the present system an indicator is not necessary. In the present system the receiver measures the time interval between transmission of radar signals and the reception of the reflected energy and uses this interval to represent the distance, or "range," of the target (e.g., other aircraft). The feedback system may be used to avoid traffic collisions (or to maintain proper buffers around the aircraft) automatically. According to the time interval of the receiving electrical signal from the receiver, the distance of the nearer aircraft from which collision has to be avoided can be calculated. If the other aircraft is very near from the aircraft and collision may occur if either aircraft's path is not changed then to avoid from the collision, the time interval in receiving echo signal will be translated into electrical signal, and will be used in feedback system of the Flight Management Computer ("FMC") of the aircraft and the FMC will change the own aircraft's path by increasing/decreasing lift and/or increasing/decreasing the speed of own aircraft automatically. The path correction may also be coordinated between various aircraft or according to preset standards of behavior or flight operation to ensure that the combined maneuvers of the aircraft are sufficient to bring about the desired buffer. That is, preset rules may be used to prevent both aircraft from changing to a new path that is still a collision path, especially if one of the craft is unable to rapidly change its course.

To Increase/Decrease Lift:

Sensing elements are installed at ailerons, Elevators, rudders, and at other flight controls. The sensing elements sense the direction or deviation/angle of the various flight controls. If an aircraft has to change its altitude, then the sensors sense the required angle difference of the flight controls to that required for the new required path. The system then matches the angle/deviation of the flight controls for the desired path and corrects the angle/deviation of flight controls by a proper feedback loop. The Actuators may be located at the control surfaces to extend/retract the control surfaces. The electrical signals/data including the information signal about angle, deviation, direction of the control surfaces are contained on the computer system which monitors the actuators through appropriate electrical connection with the actuators. The aircraft uses a control system which includes the AMS, APC, FMC as described herein. One skilled in the art would appreciate that proper mechanical or electronic or software systems are provided to stabilize the controls at the new position. This synchronization is accomplished by the sensing elements and correcting elements to reduce the time delays and to increase efficiency and correctness.

Alerting/Alarming and Indicating Systems can be Built and Installed in the Aircraft.

The sensors ("sensing elements") sense the direction, deviation/angle of the flight controls according to the angle and the length of the extended actuators. The actuators can be installed at different locations along the flight controls according to need. According to the type, shape and size of aircraft, the angle and the length of the actuators that need to be extended to get the required lift and required flight path will vary. For example, if an aircraft has to change altitude ("height") then the Aircraft Parameter Management Computer ("APC") senses the required angle difference and extended length of the flight controls to get to the new required path. The Automatic Monitoring System ("AMS") then matches the angle/deviation of the flight controls of the present condition with the required angle/deviation and required length of the flight controls for the desired path. The system then corrects the angle/deviation of the flight controls by using negative feedback systems. An Alerting/Alarming and Indication system can be built and installed to alert the craft when it is necessary to control the craft and/or to send data/information signal to the communication/Navigation systems of airport and to the ATC, Air Traffic Controller.

To Increase/Decrease Speed:

The system senses the forward/backward distance to other aircraft and calculates whether the aircraft's speed should be increased/decreased because aircraft in close proximity. This would have to be done for all the craft in the area to coordinate the global effect of any changes to one or more aircraft. This system is used during travel along the flight sense the position of forward/backward craft which are within the restricted horizontal and vertical separation limit to potential traffic collisions.

(i) Tally/Compare the Distance Between Aircraft and Own Present Aircraft Speed to Find the Required Speed Correction.

If the aircraft speed has to be altered, then the aircraft system controls the speed by controlling the fuelling systems of the aircraft including throttle/power lever, air intake, fan blade speed/size/and angle automatically by using sensors, feedback loop and controller. Although the blade size is not controllable once the aircraft is in operation, the blade size can be selected during manufacturing of the craft according to the type, weight, size etc. of the craft to ensure optimum controllability. Synchronization system can also be used to expedite or stabilize the speed correction to reduce the time delays and to increase efficiencies and correctness.

A(2) Designated Route Compliance

The aircraft can be programmed to follow a particular predetermined route.

Software can be used/installed having information for the desired route's path including for its elevation/attitude indication (display) and airport's elevation attitude and/or GPS position, etc. In case of emergency landing, for example, in an alternate airport or at an impromptu airfield, the probable and alternate airport's location (including altitude, approach, etc.)

is uploaded to the software and can be activated (to make the automatic engaging/disengaging system active) when required. Automated aircraft route-following programming can be implemented using either a software package and/or in purely electronic form.

As shown in FIG. 1, the FMC 10 will sense the difference between present flight path of aircraft 12 and the desired/designated flight path 14. In such case, the FMC will correct the angle/deviation and, if necessary, the degree of extension of the flight controls by using feedback loops until the difference between the present flight path and destined/designated flight path is zeroed.

Figure 2:
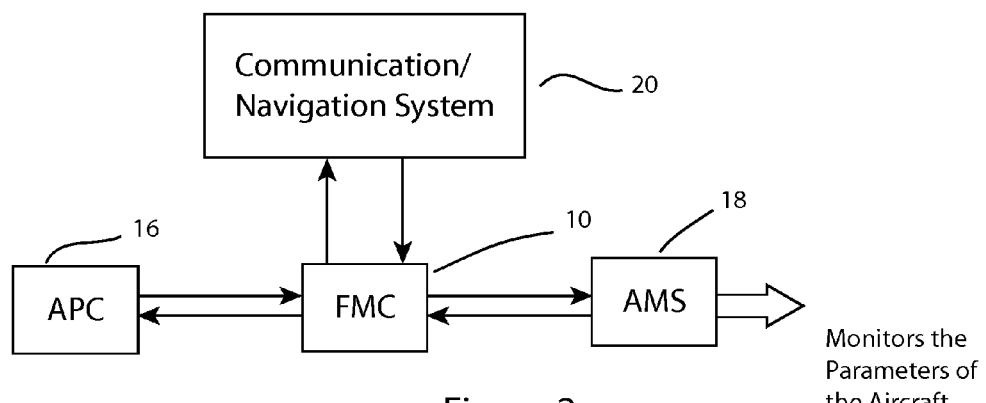
FIG. 2 is a block diagram of the concept of how the system monitors the parameters of the aircraft automatically for successful flight.

As shown in FIG. 2, the APC 16 stores the data for the normal, caution and emergency range of the parameters of the aircraft including those for the engines. The FMC compares the present sensed parameters of the aircraft with the stored/required data (parameters) of aircraft on the APC and sends the data ("information") to the AMS 18 and then according to the data received from the FMC, the AMS will activate/deactivate the systems of aircraft or changes the parameters of the aircraft necessary for the aircraft to maintain a safe flight profile.

The AMS monitors the parameters of aircraft according to the information ("data") received from the FMC. The FMC 10 also takes data from and provides data to the communication/navigation aid 20 of the airport during normal landing to make normal landings successfully and/or to make emergency landing successfully during an emergency landing. To make the normal or emergency landing successful, the AMS monitors the parameters of the aircraft and the data provided from communication/navigation aid 20 of airport after tallying the data of the APC by the data of FMC, including data from any other aircraft or obstacles in the area/intended flight path.

In every flight, the FMC contains all of the information about the desired/designated airport, any alternate airports along its routes and any airport (or alternate sites) that may be used for normal flight or in case of an emergency. The FMC is updated or activated before every flight.

The intended landing port and any alternate airport's route following software has to be uploaded or installed and can be made active (by automatic engaging/disengaging system) before every flight such as before engine start. In the FMC, all the information about destined/designated airport, alternate airports and its routes, and any airports that can be used in case of emergency along the intended flight path or during the normal flight path must be activated. This information can be made active by uploading software in FMC and/or by using the data in other forms such as in appropriate electronics circuits or microprocessors. This works will be done automatically by the AMS with coordination and utilizing the data/information signals from the FMC and APC.

During Alternate Airport Approach

The aircraft computer system can communicate/navigate the aircraft using the alternate airport's communication/navigation system data and/or information updated thereby. The aircraft computer system senses, automatically monitors or polls the alternate communication/navigations system and uses this updated information to make automated decisions selected from within the programmed range of parameters of the aircraft components including moving flight controls within their normal control limits; and by using feedback signal processing in the aircraft supplemented with the data from the communication/navigation system of the alternate airport to complete landing at the alternate airport.

The Aircraft's onboard systems communicates with the communication/navigation systems of alternate airport by sensing the data/information signal provided from the communication/navigation systems of the airport. The onboard systems of the craft will monitor the required parameters of the components of aircraft systems automatically (see FIG. 2). The normal ("critical") ranges of the parameters of the components of the craft to land safely are stored at the APC and AMS using appropriate software, for example. The limited range of parameter may include items such as position and angle of flap extensions, flight control positions, attitude, elevation, meteorological condition of any designated airports, approach obstacles, runway location and direction, taxi way position, etc. From the data/information/signal received from communication/navigation aids of airports and the data received from ATC (Air Traffic Controller), the onboard systems of the craft (e.g., APC, AMS, FMC) process the data/information signals by using feedback systems to monitor and to control the craft to land safely.

In Turbulence and Disturbance (Including Minor Faults)

By sensing/indicating the severity of faults ("snags") and turbulences, and monitoring and controlling them by adjusting the flight control system to account for these issues. The response to potential turbulence and snag sensing/indicating can be built by using programmed software and or by electronic feedback system to determine how the aircraft will respond to a variety of potential situations. All the corrections are done automatically by the aircraft in such a way as to maintain the optimum, controlled flight parameters.

To determine the level of severity of potential turbulence and faults, the normal/acceptable level of turbulence and faults will be maintained using programmed software and or by electronic systems. The programmed software determines the potential level of severity of the turbulence and then sends the data to the FMC if the level of turbulence is severe ("outside of acceptable ranges") and a change the flight path (or other flight parameter) is needed. In such a case, the FMC will change the flight path away from the turbulent area by adjusting the flight controls automatically.

The severity of other faults can be determined by the programmed software, by analyzing the programmed software's data or by comparison with the electronic circuits'data of normal parameters that have been previously stored at the APC. The FMC compares the normal required data stored at the APC and sends the information ("data") to the AMS to monitor the parameters of the aircraft to ensure safe ("controlled") flight. If the fault is minor then the onboard systems of the AMS of the aircraft work by engaging/disengaging any required systems as necessary or switches automatically to alternate or standby systems.

To sense any turbulence, a weather RADAR is used. Prior art weather RADAR systems have required indicators ("monitors"). By contrast, in the present system the RADAR system receiver directly measures the intensity of the target (here turbulence or weather) by measuring the time interval between transmission of radar signals and the reception of the reflected energy avoiding the need of an indicator. This interval along with the measured reflected energy is converted to a distance and sensed level of turbulence. The received echo signal will be translated into an electrical signal which will be used in the feedback systems to control and to change the flight path from the turbulent area automatically by adjusting flight controls in coordination with the feedback systems. To do the work automatically, the FMC will be used including the feedback loop circuit.

Severity of the Faults Sensing System

If a fault is minor then the onboard system of the aircraft does its work by connecting ("engaging")/disconnecting ("disengaging") the required system, and if necessary it can automatically switch to alternate and/or standby systems. The level of fault (i.e. minor, major, cautious, and emergency) can be differentiated by using/reading ("sensing") the parameters of the component/equipment and comparing to their normal range. The normal, caution, danger/emergency range of the parameters could be determined/retrieved from the programmed software and or by built-in electronic circuits and compared to the current condition. If the fault is major and immediate action is necessary, then the built-in system senses and prepares the emergency landing system by transferring or communicating any necessary data or initiating any sequences. For these purposes, the onboard system senses the current aircraft position, type of fault, then enables/disenables the required systems and then implements the system as described in the emergency landing section. For that purpose, the programmed software and/or electronic sensing and control systems can be used.

The AMS completes the task of engaging/disengaging the systems automatically through coordination with the APC and FMC. The AMS is also the system that utilizes the microprocessor, electronic circuits and software to do its job. The AMS monitors the parameters of Aircraft according to the information signal (data) received from FMC.

A(3) Aircraft During Landing

The aircraft follows normal processes for aircraft landing as is currently used in auto pilot systems, except that the communication/navigation system of the airport sensing/control system can be used to monitor all the required parameters and to provide any necessary instructions for landing.

A(4) After Landing

After landing, the aircraft must taxi to the proper parking area or to an area from which towing may be accomplished. A separate system could be used to conduct automated towing or to provide instructions for towing the aircraft to the required bay. In such case, then bay signaling system must be conducted in such that bay signal that it could be sensed and monitored by the aircraft by the appropriated electronic signaling system.

A(5) During Push Back

Push back can be accomplished by following the in bay signal in conjunction with the airport's runway/taxiway signals. This could represent a further electronic sensing/controlling (monitoring) system operating in conjunction (and in communication) with the aircraft computer system.

A(6) During Take Off

The aircraft computer system monitors/senses the required aircraft parameters for normal take off and controls the parameters by using the sensors and the feedback system. The aircraft built-in systems also sense/monitor any communication/navigation system of the airport.

The APC, FMC, and AMS sense and monitor all the required craft parameters, and control the craft by using sensors and feedback systems and in coordination with the communication/navigation systems of the craft. The Communication/Navigation systems of the craft sense, monitor the signal and data received from Communication/Docket: Navigation systems of Airport, and by using FMC, APC, AMS, As shown in FIG. 2, the craft will be initialized and prepared be able to take off smoothly and safely.

A(7) Start Up and Switch Off System

The aircraft initiates startups by sensing a transmitted signal from communication/navigation aids of airport and or by a ground engineer after all cabin/cargo doors are closed, such as for example, after any passengers and cargo are stored on board. An "all door closed" signal can be transferred/transmitted and sensed/confirmed by the communication/navigation system of airport to prevent premature.

Switch Off System

The switching off of the aircraft systems can be initiated either by a certain time limit after all door closed and no start up signal is received during the time after the doors are closed and or by a ground engineer. All the sensing/indicating and monitoring will be performed automatically by adjusting the parameters of all the flight controls from the automatic feedback system, similarly all other aircraft parameters can be monitored and corrected as necessary by sensing and adjusting the related parameters. For these purposes, the feedback system can be used as well as the feedback system electronic feedback system to be most effective. However, other types of feedback system can also be used.

(B) Communication/Navigation Aids of Airport

To be compatible with the current system, the airport's communication/navigation system would need to be modernized and to be implemented in such a way that it can be sensed by the aircraft systems, and that it can also sense/respond to the aircraft's sensing system and aircraft's location automatically to sense signals about all of the conditions/locations and the meteorological parameters and data provided from the airport's communication/navigation aid.

Communication/navigation (i.e., "Air-Traffic Control") systems will be improved either by the computer control/operation or by electronic means (e.g., by the ATC) over manual means so that air safety will also be improved over present types of air transport by avoiding/preventing human mistakes. In the parking bay and run way/taxi way, the signals should be implemented in such a way that the signals can be sensed, monitored, and responded to by the aircraft automatically to help meet these goals.

The advancement of Global Positioning Systems ("GPS") may be suitably used as the navigation systems of the airport. The navigation systems of the airport will have to be such that the onboard systems of the aircraft sensing systems can sense the craft's location automatically with the upgraded GPS systems and can make the aircraft flight paths in track with the actual flight path by the aircraft's sensing, monitoring and controlling systems which comprises the FMC, APC, AMS. The airport's data required for safe landing, take off, Parking, taxiing etc., information including meteorological parameters of the airport that could be transferred from the communication/Navigation aids of Airport and from ATC by the standard codes transmitted by the communication/navigation aid of airport and by ATC to the craft. The craft also can sense this data and interpret the data for use in monitoring and controlling in onboard systems, such the FMC, APC, AMS. In addition, the airport's communication/navigation systems should be such that the data (information signal) sent (transmitted) by the craft could be sensed (read) and responded to by the communication/navigation systems of airport and by ATC.

International Uniform Standard Frequency and Signal Strength Should be Used

To implement the proposed system, the manufacturer may implement the ideas from the current application or those described in U.S. patent application Ser. No. 12/378,025, filed Jan. 6, 2009, entitled "Aircraft without pilot (for commercial and military use)." After production of an aircraft according to the present invention, aircraft accidents due to human error such as errors due to pilot, air traffic controller's human errors, hijackings, terrorist attack like that of 9/11 can be eliminated. Therefore, the air transport can be the safest means of transportation. According with the type, shape and size of aircraft: parameters of the components, equipment and their indications will vary. Their normal, caution, danger and emergency ranges can vary according with the shape, size and type of aircraft. These parameters of normal, caution, danger and emergency ranges can be determined and monitored by using programmed electronic circuits and or by software packages.

Normal parameters of Aircraft's different components and systems are stored in the APC ("Aircraft Parameter Management Computer") by appropriate programming or software or by using electronic circuits data. The FMC ("Flight Management Computer") compares the required stored range data from the APC, and the APC sends the information signal (data) to the AMS (Automatic Monitoring Systems) to monitor the parameters of the aircraft to ensure a safe flight path.

The AMS is tasked with engaging/disengaging the systems automatically in coordination with the APC and FMC. The AMS is also the system that utilizes the microprocessors, electronic circuits and software to accomplish its job. The AMS monitors the parameters of Aircraft according to the information signal (data) received from FMC.

Although unmanned aircraft have already been designed, these are distinguishable from the present invention. In unmanned aircraft man, there are no pilots or passengers on board. Additionally, the aircraft can't land or take off in non-designated airports automatically and/or by using signals at the second airport. Therefore, the unmanned aircraft can't be used in passenger travel or in any commercial flight except in (unmanned) military use. By contrast, in the present aircraft ("aircraft without pilot") all passengers, cargo, any civil and almost military flights can operate just like existing aircraft, except without the need of a pilot. The present aircraft can accomplish all of the same tasks of present aircrafts but without the need for a pilot to fly the aircraft. The innovative aircraft can be used in either civil and military purposes without the need for the pilot, thereby potentially saving lives especially delivering cargo in high risk military zones. Unless explicitly stated otherwise, for the purposes of this application a "pilotless" aircraft is one that does not require a pilot for safe transit from one airport to another, but may have a pilot onboard or may have passengers or cargo. By contrast an "unmanned" aircraft is one that does not have any type of pilot onboard and is operated from a remote location.

Supplementary Details

1) To Increase and to Decrease Speed

The aircraft system tallies and compares the distance between any aircraft ahead and behind the aircraft's present position, speed, and calculates any required speed to avoid traffic collision and to safely reach the destination/designated airports.

Inertial Reference System (IRS) can be used to tally and compare the distance between the aircraft, i.e., the distance of the aircraft in the flight path whose speed have either to be increased or to be decreased and the distance of the another aircraft in the flight path from which traffic collision has to be avoided. The concept of present IRS and TCAS can be used to sense the distance between the aircraft and to avoid traffic collision as input to the onboard computer system.

(2) For Aircraft Route Following

Desired flight path routes can be directed by the onboard/developed aircraft route-following software. Aircraft route-following in the desired destined/designated path can be made either from the software developed for the purpose in a software package and/or in electronic form (e.g., electronic circuitry). Those developed software packages and/or electronic circuits can be activated in flight. The software and/or electronic circuit will sense and accordingly make the flight controls active and correct their extension/deviation, etc. to keep the flight in the desired flight path.

(3) Further Safety Features

Although a pilot is not required, in some circumstances in an emergency, control of the aircraft could be released to a pilot for "manual" operation, but this is not a necessary feature of every embodiment. Release may require passwords, authorization from a third party, etc.

The systems of different aircraft, various airports, etc. may interact or communicate to promote the overall safety and sufficiency of the systems.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

I claim:

1. A method for controlling a pilotless aircraft comprising:
   providing the pilotless aircraft with a plurality of control surfaces;
   connecting an actuator to each of said control surfaces for actuating the control surfaces and on the powerplant of the aircraft;
   providing a computer system onboard the aircraft in communication with said actuators for operating said actuators;
   storing data on the normal range of operation for each actuator in the computer system;
   storing location data on the departing airport on the computer system;
   storing location data for a predetermined destination ("arrival") airport on the computer system;
   initiating the computer system at a location remote from the aircraft;
   said computer system determining a route ("flight path") from the departing airport to the arrival airport;
   said computer operating said actuators to cause said aircraft to fly from said departing airport to said arrival airport without requiring interaction or steering commands from a pilot onboard or remote from said aircraft;
   providing an aircraft parameter management computer ("APC") in said computer system for storing the normal range of operation for each actuator and flight control;
   providing a flight management computer ("FMC") in said computer system for monitoring the current position of each actuator by comparing the current operation of each actuator to the desired actuator position;
   providing an Automatic Monitoring System ("AMS") in said computer system for actuating any actuator that is outside the desired location as determined by the FMC;
   wherein said AMS monitors the actuators for faults by comparing the current condition each flight control against the normal range stored within the APC;
   wherein said APC stores a table of fault levels comparing potential conditions of flight controls with their severity level of minor, major, cautious or emergency; and
   said AMS determining the condition of the flight control, and if said condition of the flight control is outside the normal range stored on the APC, comparing the condition against the potential conditions stored in the APC and determining from the table of faults the severity level of the fault.

2. The method of claim 1, wherein if the determined level of the fault is not minor, then said computer system prepares the aircraft for landing by automatically determining an alternate landing airport other than said designated airport and uploading said information to said FMC and causing said aircraft to land safely at the alternate airport.

3. The method of claim 1, further comprising:
providing a cockpit door separating an area on said aircraft having the computer system from a passenger area on said aircraft;
means preventing said aircraft from initiating takeoff from an airport prior to closing and locking said cockpit door to prevent passengers in said passenger area from entering the cockpit during flight.

4. The method of claim 1, further comprising:
a RADAR system on said aircraft for sensing in any direction around the aircraft;
the computer system determining the location of any other craft around the aircraft using said RADAR system;
a feedback loop in said FMC for determining if any said craft is within a predetermined buffer zone around said aircraft path, and if said craft is within the buffer zone around the aircraft, the FMC corrects the path of the aircraft to avoid the craft.

5. The method of claim 1, further comprising:
a navigation/communication system ("NCS") on said aircraft for communicating with a land based navigation communication system ("LNCS") for receiving updates to the destination airport;
said FMC receiving said updates and updating the flight path of the aircraft to steer said aircraft to the new destination airport.

6. A method for controlling an aircraft comprising:
providing the aircraft with a plurality of control surfaces;
connecting an actuator to each of said control surfaces for actuating the control surfaces and on the powerplant of the aircraft;
providing a computer system onboard the aircraft in communication with said actuators for operating said actuators;
storing data on the normal range of operation for each actuator in the computer system;
storing location data on the departing airport on the computer system;
storing location data for a predetermined destination ("arrival") airport on the computer system;
initiating the computer system at a location remote from the aircraft;
said computer system determining a route ("flight path") from the departing airport to the arrival airport;
said computer operating said actuators to cause said aircraft to fly from said departing airport to said arrival airport without requiring interaction or steering commands from a pilot onboard or remote from said aircraft;
providing an aircraft parameter management computer ("APC") in said computer system for storing the normal range of operation for each actuator and flight control;
providing a flight management computer ("FMC") in said computer system for monitoring the current position of each actuator by comparing the current operation of each actuator to the desired actuator position;
providing an Automatic Monitoring System ("AMS") in said computer system for actuating any actuator that is outside the desired location as determined by the FMC;
wherein said AMS monitors the actuators for faults by comparing the current condition each flight control against the normal range stored within the APC;
wherein said APC stores a table of fault levels comparing potential conditions of flight controls with their severity level of minor, major, cautious or emergency;
said AMS determining the condition of the flight control, and if said condition of the flight control is outside the normal range stored on the APC, comparing the condition against the potential conditions stored in the APC and determining from the table of faults the severity level of the fault;
wherein if the determined level of the fault is not minor, then said computer system prepares the aircraft for landing by automatically determining an alternate landing airport other than said designated airport and uploading said information to said FMC and causing said aircraft to land safely at the alternate airport.

7. The method of claim 6, further comprising:
providing a cockpit door separating an area on said aircraft having the computer system from a passenger area on said aircraft;
means preventing said aircraft from initiating takeoff from an airport prior to closing and locking said cockpit door to prevent passengers in said passenger area from entering the cockpit during flight.

8. The method of claim 6, further comprising:
a RADAR system on said aircraft for sensing in any direction around the aircraft;
the computer system determining the location of any other craft around the aircraft using said RADAR system;
a feedback loop in said FMC for determining if any said craft is within a predetermined buffer zone around said aircraft path, and if said craft is within the buffer zone around the aircraft, the FMC corrects the path of the aircraft to avoid the craft.

9. The method of claim 6, further comprising:
a navigation/communication system ("NCS") on said aircraft for communicating with a land based navigation communication system ("LNCS") for receiving updates to the destination airport;
said FMC receiving said updates and updating the flight path of the aircraft to steer said aircraft to the new destination airport.

10. A method for controlling a pilotless aircraft comprising:
providing the pilotless aircraft with a plurality of control surfaces;
connecting an actuator to each of said control surfaces for actuating the control surfaces and on the powerplant of the aircraft;
providing a computer system onboard the aircraft in communication with said actuators for operating said actuators;
storing data on the normal range of operation for each actuator in the computer system;
storing location data on the departing airport on the computer system;
storing location data for a predetermined destination ("arrival") airport on the computer system;
initiating the computer system at a location remote from the aircraft;
said computer system determining a route ("flight path") from the departing airport to the arrival airport;
said computer operating said actuators to cause said aircraft to fly from said departing airport to said arrival airport without requiring interaction or steering commands from a pilot onboard or remote from said aircraft; and a said computer preventing said aircraft from initiating take-off from an airport prior to closing and locking said cockpit door to prevent passengers in said passenger area from entering the cockpit during flight.

11. The method for controlling a pilotless aircraft of claim 1, wherein::
the aircraft parameter management computer ("APC") stores the normal range of operation for each system and subsystem on said aircraft;
the flight management computer ("FMC") in said computer system monitors the current position of each for each system and subsystem on said aircraft;
and the Automatic Monitoring System ("AMS") actuating any system or subsystem on the aircraft in response to the FMC.

12. The method for controlling a pilotless aircraft of claim 6, wherein:
the aircraft parameter management computer ("APC") stores the normal range of operation for each system and subsystem on said aircraft;
the flight management computer ("FMC") in said computer system monitors the current position of each for each system and subsystem on said aircraft;
and the Automatic Monitoring System ("AMS") actuating any system or subsystem on the aircraft in response to the FMC.

\* \* \* \* \*